2,714,584
Patented Aug. 2, 1955

2,714,584
COLLOIDAL ASPHALT FILLERS FOR PLASTICS

Ferdinand Küster, Borgholzhausen, Germany; Julia Küster, sole heir of said Ferdinand Küster, deceased No Drawing. Application November 20, 1951,
Serial No. 257,417

1 Claim. (Cl. 260—28.5)

This invention relates to plastic compositions and it comprises plastic compositions of the non-vulcanized variety containing, as a filler, an asphaltic pyrobitumen of substantially colloidal fineness; it further comprises plastic compositions of the type stated in which the resinous constituent is one chosen from the group of resins consisting of polyisobutylene, polyvinylchloride, polyvinylidene-chloride, silicones, polyamides and phenol-formaldehyde, the amount of asphaltic pyrobitumen filler varying over wide ranges of proportions; all as more fully hereinafter described and claimed.

It is well recognized in the art that plastics such as those enumerated above, have, in the absence of fillers, physical properties leaving much to be desired. In fact many of the valuable properties of molded plastic articles depend upon the addition of fillers to the plastic before it is molded, extruded, cast etc. The search for better fillers is an endless one and many filling materials have hitherto been suggested, such as china clay, barium sulphate and other inorganic powdery materials, and organic or carbonaceous fillers such as graphite, carbon black and the like. These fillers contribute to the physical properties of the ultimate molded product in that they increase resistance to cold flow, increase tensile strength, lessen internal strains and stresses due to contraction on cooling and more or less stabilize the molded article against shrinkage.

However, many of the fillers hitherto incorporated with the resinous, plastic-forming base materials have inherent properties making it difficult to incorporate them intimately with the plastic to the end that the advantages of the "filling action" can be fully achieved. For instance, while graphite has been suggested, it is a material not readily "wetted" by the plastic bases used. What is desired is that the filler chosen shall be one which seemingly almost "unites" with the plastic although this, of course, is more apparent than real. In any event, the filler should be one which does have a relatively low surface tension with respect to the interfacial surface tension relationships between filler particles and resinous material of which the plastic is basically composed.

There has been in this art an important demand for black fillers and pigments since only a few black pigments have been available. Among these are graphite and the various forms of carbon black, charcoal, animal black etc. But all of these, when incorporated in artificial plastics in high proportions, produce semi-conducting articles or at least articles which have somewhat lowered insulation resistance and which, of course, are not then suitable for such uses as electrical insulators. In addition most of these black pigments are difficult to incorporate in plastics owing to their non-wetting and/or porous properties.

The present invention results from the discovery that asphaltic pyrobitumens, as well as a closely related product known as Bentheimer asphaltite, when ground to a particle fineness approaching that of colloidal dimensions, are particularly desirable filling materials for plastic molding compositions of the type not ordinarily subjected to any vulcanization steps and particularly for plastic molding materials from unsaturated highly reactive compounds such as the polyvinyls, the isobutylenes, the chlorinated polyvinyls and the like.

The marked advantages of asphaltic pyrobitumen in fineness approaching colloidal dimensions seems to be due at least in part to the ready "wettability" of this material by resin-forming materials enumerated above. Surface activity doubtless plays a large part in this phenomenon and the action is not merely the admixture of a "filler" with a resin-forming material. There is colloidal union in the sense that the asphaltic pyrobitumen is wetted by the resin-forming material, rather than remaining colloidally inert. This fact results in the surprising discovery that very large amounts of the filler can be incorporated with the resin while still retaining physical characteristics in the ultimate molded product essentially like those of the resin. Thus, for instance, amounts as high as 10 parts by weight of the asphaltic pyrobitumen can be intimately incorporated with one part by weight of polyisobutylene without destroying the essential characteristics of the polyisobutylene. As I shall later describe in detail similar results are obtained when my filler is incorporated in other plastics.

A still more surprising result obtained with my new filler is that the filled plastic articles are not semi-conducting but possess high insulation resistance and therefore are particularly useful in the production of electric insulators etc. This is true of all the synthetic plastics which themselves possess insulating properties. An even more important advantage of my asphaltic pyrobitumen filler is that the plastic products produced with my filler have substantially higher tensile strengths and elongations than the same plastics containing the same proportions of graphite, for example.

In order for my invention to be more clearly understood I shall describe the characteristics of asphaltic pyrobitumen. This material is not to be confused with ordinary bituminous materials; the latter are generally soft; have low melting points; are soluble in a wide variety of organic solvents and are not readily ground in a Plausen mill or other colloid-forming mill. On the other hand, asphaltic pyrobitumen is a naturally occurring, hard, infusible non-volatile hydrocarbon insoluble in water and insoluble in most organic solvents such as carbon disulfide and others.

In the practice of my invention this asphaltic pyrobitumen is first ground to a fineness approaching and even reaching colloidal dimensions. The well-known Plausen mill is a suitable device for achieving this degree of fineness and after the grinding operation the particle size will range from a micron to a millimicron. The finer the particle size the better the colloidal filler works in the practice of my invention. The particles which result from the grinding are roundish and easily fragile in all directions as contrasted with graphite which upon grinding forms plate or leaf-like particles. Since the particles of asphaltic pyrobitumen are rounded, this means that better colloidal "dispersion" in the plastic is achieved.

In the present application I make no claim to the asphaltic pyrobitumen in substantially colloid particle size, nor do I claim ways of reducing the naturally occurring asphaltic pyrobitumen to particles of such size. The present invention is directed to plastic compositions containing such finely divided asphaltic pyrobitumen as a filler therein.

I also make no claim to the method used for incorporating my new filler into the plastic material since such methods are well within the skill of the art, as shown by such publications as "Plastics in Technical Corrosion Protection," published by Carl Hanser Co., 1949 and written by several chemists of I. G. Farben; "Plastics Without Secrets," published by Butson & Berkes, 1950, written by Dr. Stoeckhert; also several articles written by E. E. Halls, in Zeitschrift Plastics, Band 6 (1942), pages 267–274, 304–311, 352–358 and 384–394 under the title "Fillers for Plastics." It is shown in these publications that where a chemically inert, heat resistant, insoluble and infusible black filler is required, graphite has heretofore been about the only material available. But this filler has many important disadvantages. In addition to those mentioned previously it has limited availability and its cost is high; it frequently contains quartz particles of angular formation; it is difficult to wet and, by itself, it is extremely difficult to work. This applied to the artificial graphite as well as to the natural product. It therefore appears that my filler of asphaltic bitumen is the first black filler which has been discovered which can be incorporated in all non-vulcanizable plastics even in extremely large proportions with improvement in the physical and chemical properties of the product and without the danger of making the product a semi-conductor.

I shall now give examples of how my invention can be practiced and I shall refer to numerous plastics with which the asphaltic pyrobitumen can be intimately admixed without however limiting myself to a particular plastic other than as shall appear in the appended claims.

Example 1

In this example of ways of practicing my invention I start with polyisobutylene and finely divided asphaltic pyrobitumen. In the case of polyisobutylene the operative range of proportions is great. These can range from small proportions of from about 5 to 10 per cent by weight of the asphaltic pyrobitumen to equal parts by weight and even to ratios as high as 10 parts by weight of pyrobitumen for each part by weight of the polyisobutylene. Any intermediate ratios of pyrobitumen to polyisobutylene within this range are operative and contribute to the desired properties in the ultimate plastic composition. I find in the case of polyisobutylene that this material will readily accept and intimately admix with asphaltic pyrobitumen throughout this wide range of proportions and, since for economic reasons it is generally desirable to incorporate as much filler as possible in a plastic, it is evident that this high compatibility is of great advantage. The products produced with the new filler all possess higher tensile strengths and greater tear resistances than similar products produced with the same proportions of graphite as a filler.

Example 2

Excellent results are obtained when the filler of the present invention is intimately admixed with the polyvinyl-type resins, of which polyvinylchloride and polyvinylidene chloride are good examples. Both are well known in the art. When dealing with these resins I find that I can incorporate the asphaltic pyrobitumen in proportions ranging from about 2 parts by weight of the filler to 100 parts by weight of the polyvinyl or polyvinylidene derivative, up to 50 parts or more by weight of the filler for each 100 parts by weight of the polyvinyl or polyvinylidene chloride. This is a wide range of proportions and illustrates that because of the marked readiness with which the fillers of the present invention "combine" with the base resin an ultimate molding compound can be prepared which is virtually "tailored" to meet particular specifications with respect to tensile strength, resistance to cold flow and shrinkage.

Example 3

Still another type of resin to which the asphaltic pyrobitumen fillers of the present invention can be added is the silicone type. These resins are becoming of increasing importance in the arts. In dealing with them I find that the preferred range of proportions of filler to resin is about 10 to 150 parts by weight of the filler for each 100 parts by weight of the silicone resin.

Example 4

The polyamide resins are also suitable for incorporating with the fillers of the present invention. Here again there is a wide range of proportions available and the ranges I find most suitable are about 10 to 100 parts by weight of the asphaltic pyrobitumen filler for each 100 parts by weight of the polyamide resins.

Example 5

Finally, in order to show the versatility and adaptability of the filler of the present invention to a wide range of resin types I shall include the well known phenolformaldehyde resins. Here, however, not quite so much of the filler can be incorporated for best results and I find that a range of from 2 to 25 parts by weight of filler for each 100 parts by weight of resin should usually be selected.

All other non-vulcanizable resins can be improved by intimately incorporating with the resin my finely ground asphaltic pyrobitumen; the above resins specifically described are but illustrative. And it is to be expected that those skilled in this art will test various ratios of resin to filler in order for the ultimate composition to have the physical properties desired. Specific proportions are subject to wide variation having regard to the resin with which the asphaltic pyrobitumen is to be combined and the purpose to which the final resin composition is to be put.

This application is a continuation-in-part of my co-pending application Serial No. 72,061, filed January 21, 1949, now abandoned. The present application covers the same invention which is described and claimed in the prior application but illustrates the invention by a number of specific examples.

While I have described what I consider to be the most advantageous embodiments of my invention it is evident, of course, that various modifications can be made in the compositions which have been described without departing from the purview of this invention. Thus it is possible to incorporate in my compositions any of the conventional additives, such as softeners, plasticizers and the like. It is also possible to employ mixed fillers, for example mixtures of carbon black and asphaltic pyrobitumen can be employed, if desired. In one comparative test using mixed fillers a composition was prepared from 1 part of a high polymer hydrocarbon, 1 part lamp black and 1 part graphite. This was formed into a film and it was found that the cross sectional tensile strength of the film was from 35 to 40 kg./cm.$^2$. When finely-divided Bentheimer Asphaltite was substituted for the graphite in this composition it was possible to produce under the same conditions a very smooth excellent film having a tensile strength of from 40 to 50 kg./cm.$^2$. It was also found possible to make a standard tubing from the latter composition on a small extrusion machine at an operating temperature of 95° C. with the screw of the machine operating at 60 revolutions per minute. Other modifications of my invention which fall within the scope of the following claim will be immediately evident to those skilled in this art.

What I claim is:

A plastic molding composition comprising an organic synthetic resin selected from the class consisting of polyvinyl chloride and polyvinylidene chloride, and a filler of an asphaltic pyrobitumen intimately admixed to said resin, in the proportions of between 2 and 50 parts by weight of asphaltic pyrobitumen to 100 parts by weight of resin, said filler being of substantially colloidal fineness with a particle size between one micron and one millimicron, said plastic composition being characterized by having high insulation resistance, high tensile strength and high resistance to cold flow.

References Cited in the file of this patent

Abraham: "Asphalts and Allied Substances," 4th ed., 1938, Van Nostrand Co., N. Y., pages 56 and 57.